(12) United States Patent
Lim (10) Patent No.: US 10,849,194 B2
(45) Date of Patent: Nov. 24, 2020

(54) ELECTRIC HEATING DEVICE AND ASSEMBLY INCLUDING THE SAME FOR RADIANT HEATING SYSTEM

(71) Applicant: Hanbok Lim, Seoul (KR)

(72) Inventor: Hanbok Lim, Seoul (KR)

(73) Assignee: Hanbok Lim, Seoul (KR)

( * ) Notice: Subject to any disclaimer, the term of this patent is extended or adjusted under 35 U.S.C. 154(b) by 249 days.

(21) Appl. No.: 16/049,841

(22) Filed: Jul. 31, 2018

(65) Prior Publication Data

US 2019/0357313 A1 Nov. 21, 2019

Related U.S. Application Data

(60) Provisional application No. 62/672,185, filed on May 16, 2018.

(51) Int. Cl.
| | |
|---|---|
| H05B 1/02 | (2006.01) |
| H05B 3/42 | (2006.01) |
| H01R 4/64 | (2006.01) |
| H01R 4/02 | (2006.01) |
| H01F 27/28 | (2006.01) |
| H05B 3/03 | (2006.01) |
| F24D 13/02 | (2006.01) |

(52) U.S. Cl.
CPC ............ *H05B 3/42* (2013.01); *F24D 13/024* (2013.01); *H01F 27/2823* (2013.01); *H01R 4/029* (2013.01); *H01R 4/643* (2013.01); *H05B 1/0275* (2013.01); *H05B 3/03* (2013.01); *H05B 2203/016* (2013.01); *H05B 2203/026* (2013.01)

(58) Field of Classification Search
CPC .......... H05B 3/42; H05B 1/0275; H05B 3/03; H05B 2203/016; H05B 2203/026; F24D 13/024; H01F 27/2823; H01R 4/029; H01R 4/643
USPC ................ 219/494, 535, 534, 537, 541, 544
See application file for complete search history.

(56) References Cited

U.S. PATENT DOCUMENTS

| | | | | |
|---|---|---|---|---|
| 2,981,818 A | * | 4/1961 | Trabilcy | B41B 11/00 392/478 |
| 3,593,002 A | * | 7/1971 | Hebert | H05B 3/06 219/541 |
| 4,087,777 A | * | 5/1978 | Clasen | C04B 35/04 174/102 P |
| 4,092,520 A | | 5/1978 | Holmes et al. | |

(Continued)

FOREIGN PATENT DOCUMENTS

| | | |
|---|---|---|
| KR | 10-0400958 | 9/2003 |
| KR | 10-2008-0098214 | 11/2008 |

(Continued)

*Primary Examiner* — Mark H Paschall
(74) *Attorney, Agent, or Firm* — H.C. Park & Associates, PLC (57) ABSTRACT

An electric heating device includes a conductive pipe having an interior and at least one end portion, one or more heating elements disposed in the conductive pipe, one or more power connectors extending into the interior of the conductive pipe to be electrically connected to the one or more heating elements, a ground connector contacting the at least one end portion of the conductive pipe to be electrically connected to the conductive pipe, and a first member enclosing the at least one end portion of the conductive pipe, the one or more power connectors, and the ground connector.

17 Claims, 7 Drawing Sheets

(56) References Cited

U.S. PATENT DOCUMENTS

| | | | | |
|---|---|---|---|---|
| 4,626,665 A | * | 12/1986 | Fort, III | C08F 8/44 |
| | | | | 219/534 |
| 4,878,332 A | * | 11/1989 | Drake | F24D 3/141 |
| | | | | 52/745.05 |
| 5,977,519 A | * | 11/1999 | Sorensen | H05B 3/48 |
| | | | | 118/728 |
| 6,303,905 B1 | * | 10/2001 | Chiles | H05B 3/34 |
| | | | | 219/213 |
| 6,380,735 B1 | | 4/2002 | Kawakami | |
| 6,958,463 B1 | * | 10/2005 | Kochman | H05B 3/56 |
| | | | | 219/494 |
| 2009/0034914 A1 | * | 2/2009 | Huang | G02B 6/4201 |
| | | | | 385/92 |

FOREIGN PATENT DOCUMENTS

| | | |
|---|---|---|
| KR | 10-2012-0112963 | 10/2012 |
| KR | 10-2013-0008237 | 1/2013 |
| KR | 10-1303895 | 9/2013 |
| KR | 10-1746775 | 6/2017 |
| KR | 10-2017-0106891 | 9/2017 |

* cited by examiner

ELECTRIC HEATING DEVICE AND ASSEMBLY INCLUDING THE SAME FOR RADIANT HEATING SYSTEM

CROSS-REFERENCE TO RELATED APPLICATION

This application claims priority from and the benefit of U.S. Provisional Patent Application No. 62/672,185, filed on May 16, 2018, which is hereby incorporated by reference for all purposes as if fully set forth herein.

BACKGROUND

Field

Exemplary implementations of the invention relate generally to radiant heating devices and assemblies including the same and, more specifically, to electronic devices and assemblies including a heating module buried in a layer such as floors, ceilings and/or walls.

Discussion of the Background

A radiant heating system refers to temperature-controlled surfaces that exchange heat with their surrounding environment through convection and radiation. The radiant heating system includes a heating module buried in a layer, such as the floors, ceilings, or walls. For example, a hydronic radiant heating system includes water pipes buried in the layer and passing hot water for heating. Electrical radiant heating systems include heating wires buried in the layer having electrical resistance that generates heat when current is conducted through the wiring.

The demand for the electrical heating systems is increasing because of its simple construction and low maintenance cost. However, the electrical heating system may generate, during operation, electromagnetic fields which may adversely affect the human body.

The above information disclosed in this Background section is only for understanding of the background of the inventive concepts, and, therefore, it may contain information that does not constitute prior art.

SUMMARY

Devices constructed according to exemplary implementations of the invention are capable of preventing or at least reducing electromagnetic fields from being generated in radiant heating systems and have relatively high durability, such as resistance to corrosion.

For example, according to the principles and exemplary implementations of the invention, ground terminals electrically connecting the pipe containing the heating elements to external wires may be connected to ground. Accordingly, the current induced in the pipe during heating may be discharged to the ground, and the negative effects on the human body may be prevented or at least be reduced.

In addition, in some embodiments, the ground terminal may contact at least one of the end portions of the pipe and be enclosed and protected by the housing. Accordingly, the ground terminal discharging the induced current of the pipe may have relatively high durability such as the resistance to corrosion, and thus its characteristics can be maintained as desired Additional features of the inventive concepts will be set forth in the description which follows, and in part will be apparent from the description, or may be learned by practice of the inventive concepts.

According to one or more embodiments of the invention, an electric heating device includes a conductive pipe having an interior and at least one end portion; one or more heating elements disposed in the interior of the conductive pipe; one or more power connectors extending into the interior of the conductive pipe to be electrically connected to the one or more heating elements; a ground connector contacting the at least one end portion of the conductive pipe to be electrically connected to the conductive pipe; and a first member enclosing the at least one end portion of the conductive pipe, the one or more power connectors, and the ground connector.

The electric heating device may further include a second member disposed in the housing to seal an opening in the at least one end portion of the conductive pipe, the one or more power connectors, and the ground connector.

The one or more heating elements may include a first heat wire and a second heat wire each extending through the conductive pipe; and the one or more power connectors may include a first power terminal connected to the first heat wire and a second power terminal connected to the second heat wire.

The electric heating device may further include a first external wire connected to the first power terminal through a first node; a second external wire connected to the second power terminal through a second node; and a third external wire connected to the ground connector through a third node, wherein the first member may enclose the first to third nodes.

The first heat wire and the second heat wire may be electrically connected to each other in series between the first power terminal and the second power terminal.

The electric heating device may further includes a connection wire connecting the first power terminal and the second power terminal to each other; and a first external wire connected to the ground connector through a first node, wherein the first member may enclose the connection wire and the first node.

The first heat wire and the second heat wire may be electrically connected to a second external wire and a third external wire, respectively.

The electric heating device may further include an inductor circuit surrounding a portion of the conductive pipe, wherein the one or more power connectors may include a first power terminal and a second power terminal being electrically connected to each other through the inductor circuit, and the first member may enclose the inductor circuit.

The electric heating device may further include a first connection wire connecting the first power terminal to a first node; and a second connection wire connecting the second power terminal to a second node, wherein the inductor circuit may be electrically connected between the first node and the second node, and the first member may enclose the first connection wire, the second connection wire, the first node, and the second node.

The electric heating device may further include a heat conduction material disposed in the interior of the conductive pipe; and an end cap closing an opening into the interior of the conductive pipe to retain the heat conduction material within the interior of the conductive pipe, wherein the ground connector may extend through the end cap.

The first member may include a housing and the ground connector may include a ground terminal.

According to one or more embodiments of the invention, an electric heating device includes a conductive pipe having two opposed ends; heating elements disposed in the conductive pipe; first power connectors extending through a first one of the ends of the conductive pipe to be electrically connected to the heating elements; second power connectors extending through a second one of the ends of the conductive pipe to be electrically connected to the heating elements; a first ground connector contacting a first portion of the conductive pipe adjacent to the first end of the conductive pipe; a second ground connector contacting a second portion of the conductive pipe adjacent to the second end of the conductive pipe; a first member enclosing the first power connectors, the first ground connector, and the first portion of the conductive pipe; and a second member enclosing the second power connectors, the second ground connector, and the second portion of the conductive pipe.

The electric heating device may further include first external wires connected to the first power connectors through first nodes; a second external wire connected to the first ground connector through a second node; a connection circuit connecting the second power connectors to each other; and a third external wire connected to the second ground connector through a third node, wherein the first member may enclose the first nodes and the second node, and the second member may enclose the connection circuit and the third node.

The connection circuit may include an inductor circuit surrounding a portion of the conductive pipe; and connection wires connecting the second power connectors to the inductor circuit.

The electric heating device may further include first external wires connected to the first power connectors through first nodes; a second external wire connected to the first ground connector through a second node; third external wires connected to the second power connectors through third nodes; and a fourth external wire connected to the second ground connectors through a fourth node, wherein the first member may enclose the first nodes and the second node, and the second member may enclose the third nodes and the fourth node.

The electric heating device may further include a heat conduction material disposed in the interior of the conductive pipe; a first end cap adjacent to the first end of the conductive pipe to retain the heat conduction material; and a second end cap adjacent to the second end of the conductive pipe to retain the heat conduction material, wherein the first and second ground connectors may extend through the first and second end caps, respectively.

The first member may include a first housing and the second member may include a second housing.

The first housing and the second housing may be substantially symmetrical to each other.

The first and second ground connectors may include ground terminals.

The heating elements may include wires and the first and second power connectors may include power terminals.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1:
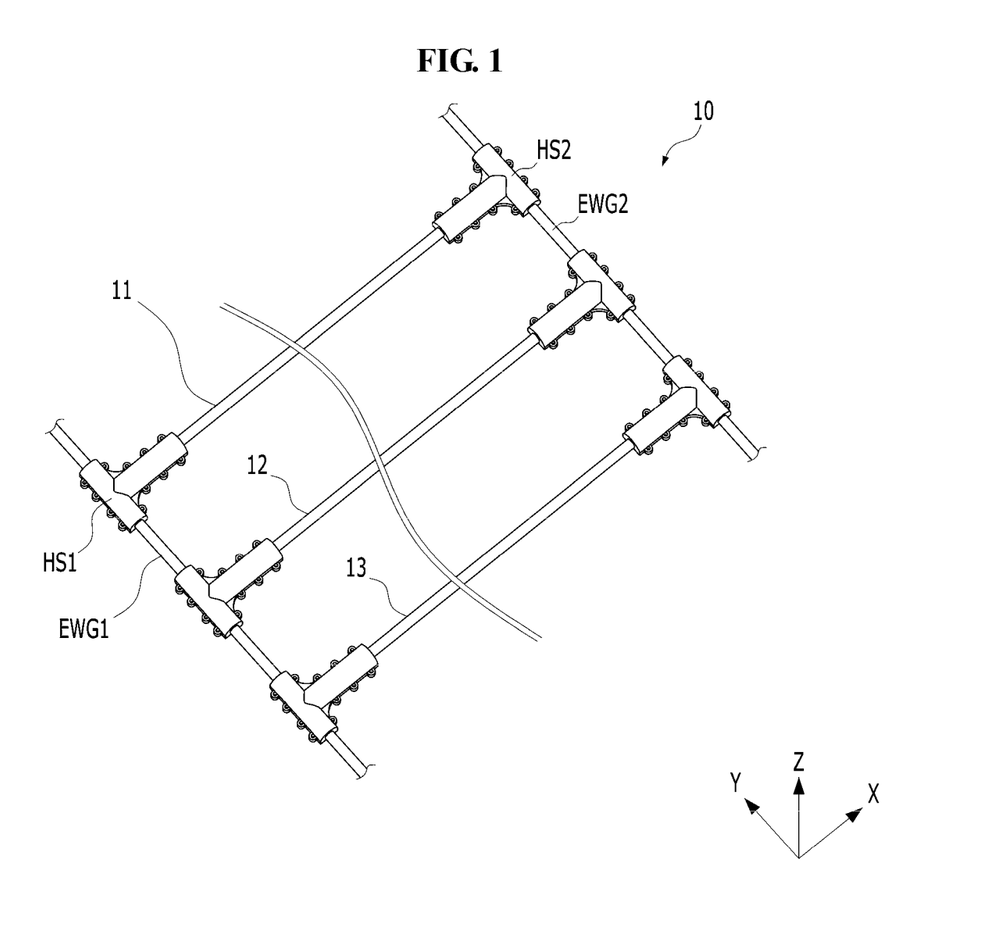
FIG. 1 is a perspective view of an electric heater assembly constructed according to an exemplary embodiment of the invention.

FIG. 1 is a perspective view of an electric heater assembly constructed according to an exemplary embodiment of the invention.

Referring to FIG. 1, the electric heater assembly 10 includes a plurality of heating devices 11 to 13. The first to third heating devices 11 and 13 are arranged in a second direction Y, and each of the first to third heating devices 11 and 13 extends in a first direction X, which may be generally perpendicular to the second direction Y.

The first to third heating devices 11 to 13 are electrically connected to a first external wire group EWG1 and a second external wire group EWG2, each of which may extend generally in the second direction Y. The first to third heating devices 11 to 13 may receive electric power, such as alternating current (AC), through at least one of the first and second external wire groups EWG1 and EWG2, and provide heat to a layer in which the electric heater assembly 10 is buried.

At least one of the first and second external wire groups EWG1 and EWG2 may include power wires to transmit current and voltage of the electric power to the first to third heating devices 11 to 13. At least one of the first and second external wire groups EWG1 and EWG2 may further include a ground (or earth) wire that connects first to third heating devices 11 to 13 to the ground. The ground wire connection will be described in detail with reference to FIGS. 2, 7, and 9.

Each of the first to third heating devices 11 to 13 includes a first housing HS1 and a second housing HS2 that connect the heating device to the first and second external wire groups EWG1 and EWG2 and protect connection nodes between terminals of the heating device and the first and second external wire groups EWG1 and EWG2 from external forces and contaminants.

Figure 2:
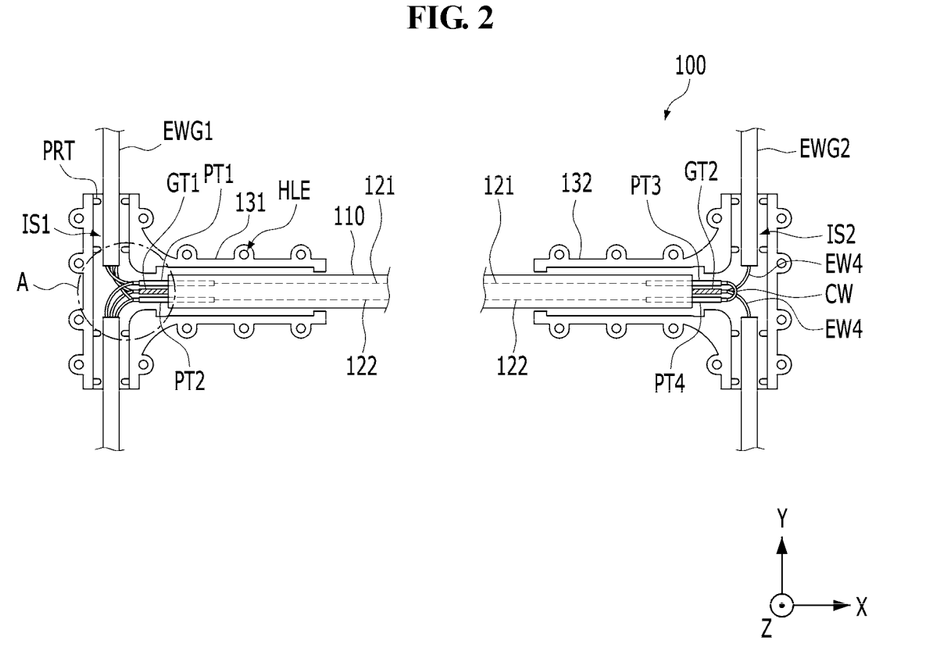
FIG. 2 is a plan view of an exemplary embodiment of one of the electric heating devices shown in FIG. 1.
Figure 3:
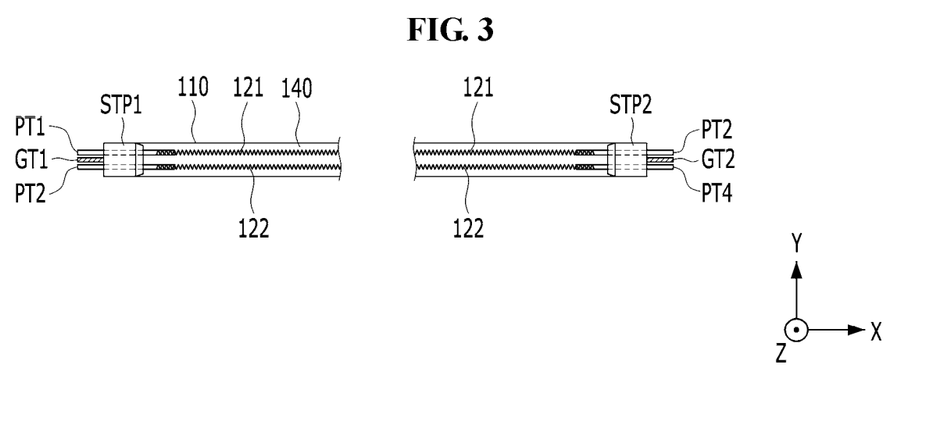
FIGS. 3 and 4 are a plan view and a side view of an exemplary embodiment of the pipe connected to power terminals and ground terminals constructed according to the principles of the invention.
Figure 4:
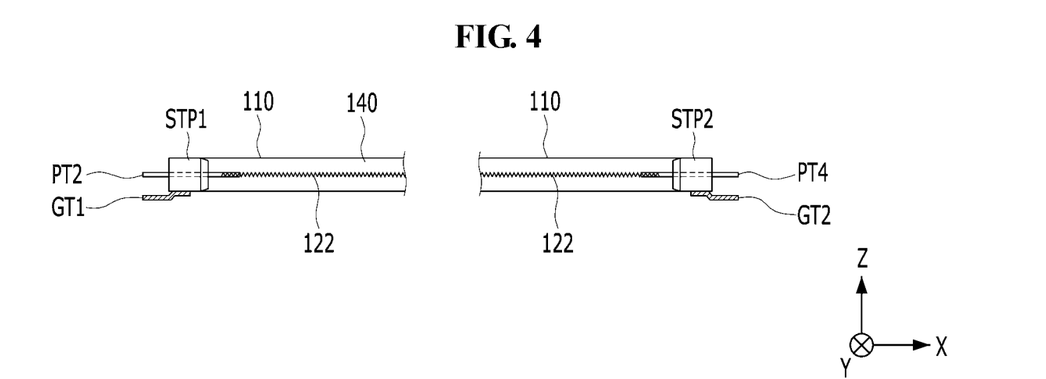
Figure 5:
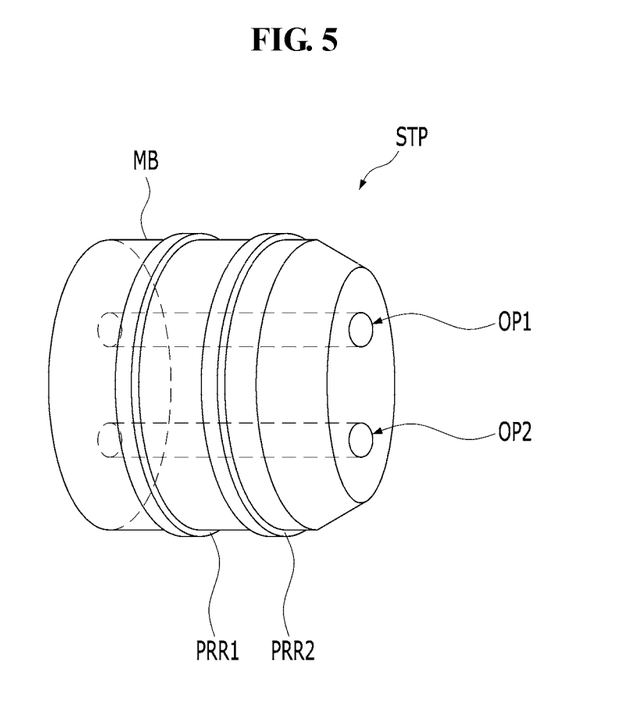
FIG. 5 is a perspective view of an exemplary embodiment of one of the pipe stoppers shown in FIGS. 3 and 4.
Figure 6:
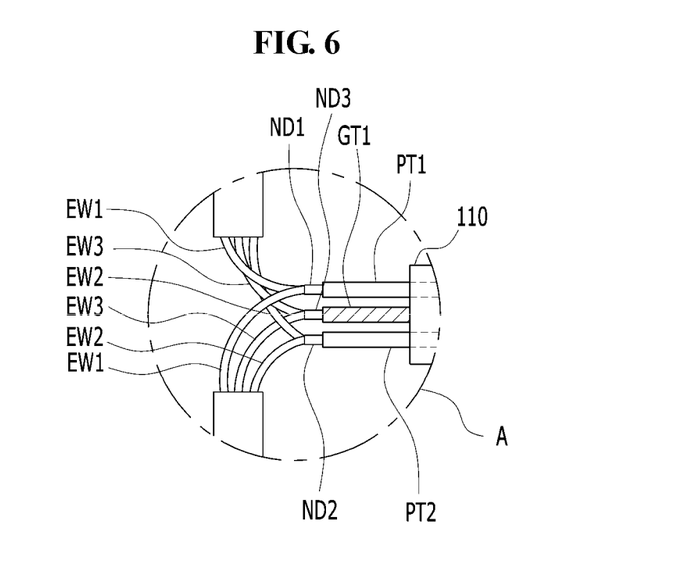
FIG. 6 is an enlarged view of the portion A of FIG. 2.

FIG. 2 is a plan view of an exemplary embodiment of one of the electric heating devices shown in FIG. 1. FIGS. 3 and 4 are a plan view and a side view of an exemplary embodiment of the pipe connected to power terminals and ground terminals constructed according to the principles of the invention. FIG. 5 is a perspective view of an exemplary embodiment of one of the pipe stoppers shown in FIGS. 3 and 4. FIG. 6 is an enlarged view of the portion A of FIG. 2.

Referring to FIG. 2, the heating device 100 includes a pipe 110, first and second heat wires 121 and 122 extending through the pipe, first and second lower covers 131 and 132, first to fourth power terminals PT1 to PT4, and first and second ground terminals GT1 and GT2.

The pipe 110 extends generally in the first direction X. The pipe 110 protects one or more heat wires disposed in the pipe 110, such as the first and second heat wires 121 and 122. The pipe 110 may include materials suitable for protecting the first and second heat wires 121 and 122 from external environments such as moisture, oxygen, etc., and suitable for transmitting the heat generated from the first and second heat wires 121 and 122 to a layer in which the heating device 100 is buried. For example, the pipe 110 may be formed of steel having a relatively high resistance to corrosion, such as stainless steel.

The first and second heat wires 121 and 122 are spaced apart from each other in the pipe 110, and extend along the pipe 110, generally in the first direction X. Each of the first and second heat wires 121 and 122 may have a shape of a coil spring having electrical resistance for heating. The first and second heat wires 121 and 122 are electrically connected to one or more power terminals, such as the first to fourth power terminals PT1 to PT4, that extend to an interior of the pipe 110 through both ends of the pipe 110.

Referring to FIGS. 3 and 4, the first heat wire 121 is connected between the first and third power terminals PT1 and PT3, and the second heat wire 122 is connected between the second and fourth power terminals PT2 and PT4. The first and second power terminals PT1 and PT2 extend through a first end of the pipe 110 to be connected to the first and second heat wires 121 and 122, respectively. The third and fourth power terminals PT3 and PT4 extend through a second end of the pipe 110 opposite to the first end of the pipe 110 to be connected to the first and second heat wires 121 and 122, respectively.

One or more ground terminals, such as the first and second ground terminals GT1 and GT2, are adjacent to at least one of the ends of the pipe 110 and contact the pipe 110. The first ground terminal GT1 may contact a first end portion of the pipe 110 and the second ground terminal GT2 may contact a second end portion of the pipe 110 opposite to the first end portion of the pipe 110. Also, the first and second ground terminals GT1 and GT2 may be electrically connected to ground wires, such as third and fourth external wires EW3 and EW4 of FIG. 2.

The first and second heat wires 121 and 122 generate the heat when receiving the current through at least one of the first to fourth power terminals PT1 to PT4. The pipe 110 may include a material, such as stainless steel, having a relatively high resistance to corrosion, and the material of the pipe 110 may be conductive. In this case, during the operation, current may be induced in the pipe 110 due to the alternating current flowing through the first and second heat wires 121 and 122. The induced current of the pipe 110 may generate electromagnetic induction, which may have a negative effect on the human body even though the heating device 100 is buried in a layer such as the floor, ceiling, or wall, and other materials are disposed between the heating device 100 and a surface of the layer. As the distance between the surface and the heating device 100 decreases, the heat generated by the heating device 100 may be transmitted to the surface effectively, but the electromagnetic induction may have more pronounced effects on the human body. According to exemplary embodiments and the principles of the invention, the first and second ground terminals GT1 and GT2 electrically connecting the pipe 110 to the third and fourth external wires EW3 and EW4 are connected to the ground. Accordingly, the current induced in the pipe 110 during heating may be discharged to the ground. Thus, the negative effects on the human body may be prevented or at least be reduced.

A filler 140 may further be provided in the pipe 110. The filler 140 includes non-conductive materials to insulate the first heat wire 121, the second heat wire 122, and the inner surface of the pipe 110 from each other. In an exemplary embodiment, the filler 140 includes a heat conduction material, such as magnesium oxide (MgO).

A first stopper STP1 may close an opening into the interior of the pipe 110 at a first end of the pipe 110 and a second stopper STP2 may close an opening into the interior of the pipe 110 at a second end of the pipe 110 opposite to the first end of the pipe 110 in order to retain or seal the filler 140. Referring to FIG. 5, a stopper STP may include a main body MB and double protrusion rings PRR1 and PRR2. The main body MB may have a first opening OP1 and a second opening OP2 through which the power terminals pass. In the manufacturing process, the first and second stoppers STP1 and STP2 may be installed at the both ends of the pipe 110 after the filler powder of the filler 140 is filled in the pipe 110, and then the pipe 110 may be compressed with a certain temperature. Since the first and second stopper STP1 and STP2 includes double protrusion rings PRR1 and PRR2 forming air barrier with the inner surface of the pipe 110, the first and second stoppers STP1 and STP2 may seal the filler powder effectively and efficiently when the pipe 110 is compressed.

Referring back to FIG. 2, the first and second heat wires 121 and 122 may receive current through some of the first to fourth power terminals PT1 to PT4 to generate radiant heat. Referring to FIG. 6 together with FIG. 2, the first power terminal PT1 may be connected to a first external wire EW1 through a first node ND1, the second power terminal PT2 may be connected to a second external wire EW2 through a second node ND2. For example, the terminal and the wire may be welded to each other with a sleeve interposed therebetween so as to be fixed and electrically connected to each other. The third and fourth power terminals PT3 and PT4 may be connected to each other through a connection wire CW. As such, the first and second heat wires 121 and 122 may be connected to each other in series between the first and second power terminals PT1 and PT2, and receive the current from the first and second power terminals PT1 and PT2.

In case of the first and second heat wires 121 and 122 having a coil spring shape, the electromagnetic field induced by the current of the first heat wire PT1 may be canceled out by the electromagnetic field induced by the current of the second heat wire PT2 according to Ampere's law. Accordingly, the first and second heat wires 121 and 122 connected between the first and second power terminals PT1 and PT2 in series may prevent or at least reduce the electromagnetic induction that may have a negative effect on the human body.

The first ground terminal GT1 may be connected to a third external wire EW3 through a third node ND3. The second ground terminal GT2 may be connected to a fourth external wire EW4. The third and fourth external wires EW3 and EW4 are connected to the ground.

Housings HS1 and HS2 enclose the first and second end portions of the pipe 110, the first to fourth power terminals PT1 to PT4, the first and second ground terminals GT1 and GT2, the nodes connecting the terminals PT1 to PT4 and the GT1 and GT2 to the external wires EW1 to EW4, and portions of first and second external wire groups EWG1 and EWG2. In an exemplary embodiment, the first housing HS1 and the second housing HS2 may include non-conductive materials that prevent current from flowing to the external. In an exemplary embodiment, each of the first and second housings HS1 and HS2 includes a lower cover and an upper cover assembled with the lower cover. In FIG. 2, the upper covers are omitted for clarity and descriptive convenience.

The first lower cover 131 is disposed to be adjacent to the first end portion of the pipe 110. The first lower cover 131 may be assembled with a first upper cover to form the first housing HS1 shown in FIG. 1. For example, the first lower cover 131 has holes HLE, and the first upper cover has projections corresponding to the holes HLE. The holes HLE may receive the projections of the first upper cover so that the first lower cover 131 may be assembled with the first upper cover by suitable fasteners. At least one of the first lower cover 131 and the first upper cover may include protrusions PRT extending inwardly from the inner surface of the housing to retain a first external wire group EWG1. The first lower cover 131 and the first upper cover may have, when assembled, an opening such as a first internal space IS1 that is filled with a sealing member, such as epoxy. Accordingly, the first end portion of the pipe 110, the first and second power terminals PT1 and PT2, the first ground terminal GT1, the nodes connecting the first and second power terminals PT1 and PT2 and the first ground terminal GT1 to the first to third external wires EW1 to EW3, and portions of the first external wire group EWG1 positioned in the first internal space IS1 may be sealed by the sealing member and protected from external environments and/or contaminants such as moisture, oxygen, etc.

The second lower cover 132 is disposed to be adjacent to the second end portion of the pipe 110, and may be assembled with a second upper cover to form the second housing HS2 shown in FIG. 1. The second lower cover 132 may be symmetrical to the first lower cover 131 and may also have the holes HLE for receiving projections of the second upper cover such that the second lower cover 132 may be assembled with the second upper cover. The second housing HS2 including the second lower cover 132 and the second upper cover may have a second internal space IS2. Similar to the first internal space IS1, the second internal space IS2 is filled with a sealing member such as epoxy. Accordingly, the second end portion of the pipe 110, the third and fourth power terminals PT3 and PT4, the second ground terminal GT2, the connection wire CW, the nodes connecting the second ground terminal GT2 to the fourth external wire EW4, and portions of the second external wire group EWG2 positioned in the second internal space IS2 may be sealed by the sealing member and protected from external environments.

The heating device 100 may be buried in one of various kinds of structures including layers. Some kinds of layers may include moisture, oxygen, etc. causing the heating device 100 to be corroded. If the ground terminal contacting the pipe 110 are not disposed in and protected by the housing that encloses the power terminals, the ground terminal may be corroded gradually by moisture, oxygen, etc., and its characteristics and reliability may be changed. According to exemplary embodiments and the principles of the invention, the ground terminal contacts at least one of the end portions of the pipe 110 and is enclosed and protected by the housing. Accordingly, the ground terminal discharging the induced current of the pipe 110 may have relatively a high durability such as the resistance to corrosion, and thus its electrical characteristics can be maintained as desired.

The first external wire group EWG1 and the second external wire group EWG2 extend generally in the second direction Y. Each of the first and second external wire groups EWG1 and EWG2 may include at least one external wire and a sheath surrounding its external wire. In the illustrated embodiment, the first external wire group EWG1 includes the first and second external wires EW1 and EW2, which are power wires, and the third external wires EW3, which is a ground wire. The second external wire group EWG2 includes the fourth external wire EW4, which is ground wire.

Figure 7:
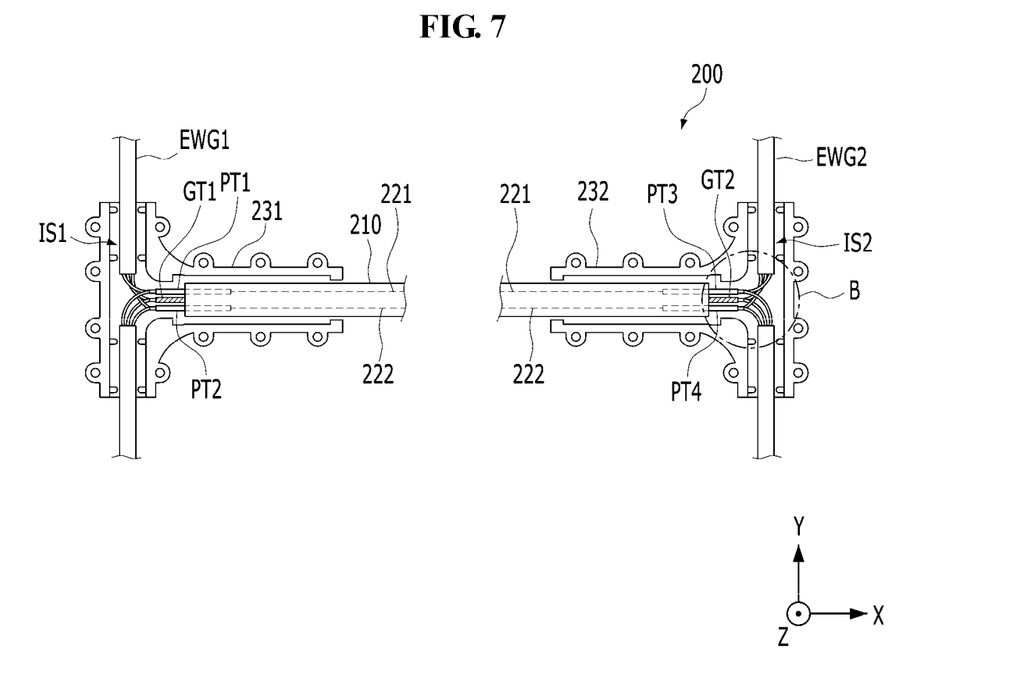
FIG. 7 is a plan view of another exemplary embodiment of one of the electric heating devices shown in FIG. 1.
Figure 8:
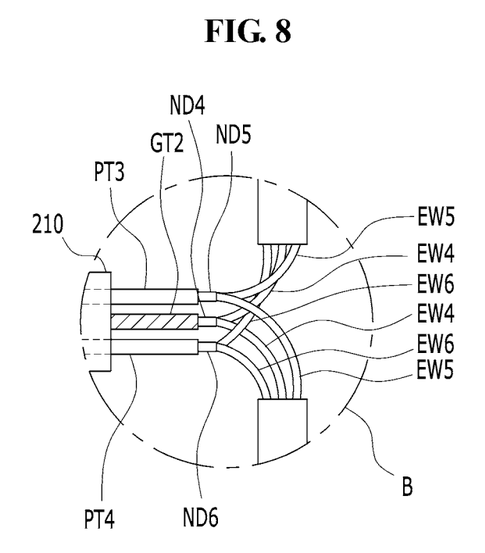
FIG. 8 is an enlarged view of the portion B of FIG. 7.

FIG. 7 is a plan view of another exemplary embodiment of one of the electric heating devices shown in FIG. 1. FIG. 8 is an enlarged view of the portion B of FIG. 7.

Referring to FIGS. 7 and 8, a heating device 200 includes a pipe 210, first and second heat wires 221 and 222, first and second lower covers 231 and 232, first to fourth power terminals PT1 to PT4, first and second ground terminals GT1 and GT2, and first and second external wire groups EWG1 and EWG2. The pipe 210, the first and second heat wires 221 and 222, the first and second lower covers 231 and 232, the first and second power terminals PT1 and PT2, the first and second ground terminals GT1 and GT2, and the first external wire group EWG1 may be configured substantially the same as the pipe 110, the first and second heat wires 121 and 122, the first and second lower covers 131 and 132, the first and second power terminals PT1 and PT2, the first and second ground terminals GT1 and GT2, and the first external wire group EWG1, respectively. Accordingly, descriptions of these components are unnecessary and will be omitted for clarity and conciseness.

The first to fourth power terminals PT1 to PT4 may electrically be connected to the external wires of the first and/or second external wire groups EWG1 and EWG2 in various manners. In FIGS. 7 and 8, similar to the illustrated embodiment of FIG. 2, the first and second power terminals PT1 and PT2 are connected to the power wires of the first external wire groups EWG1.

The third and fourth power terminals PT3 and PT4 may be connected to power wires. The second external wire group EWG2 may include fourth to sixth external wires EW4 to EW 6 and a sheath surrounding the fourth to sixth external wires EW4 to EW6. The second ground terminal GT2 may be connected to the fourth external wire EW4 through a fourth node ND4 as described with reference to FIG. 2. The third power terminal PT3 may be connected to the fifth external wire EW5 through a fifth node 5, and the fourth power terminal PT4 may be connected to the sixth external wire EW6 through a sixth node ND6. As such, the first heat wire 221 may be electrically connected between the first external wire EW1 and the fifth external wire EW5, and the second heat wire 222 may be electrically connected between the second external wire EW2 and the sixth external wire EW6.

Figure 9:
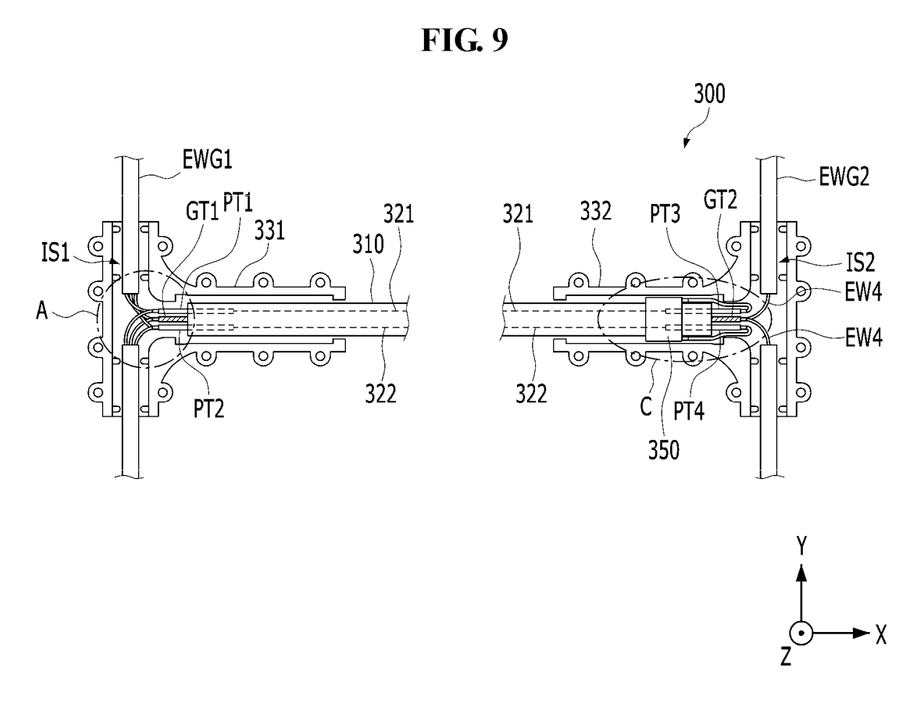
FIG. 9 is a plan view of still another exemplary embodiment of one of the electric heating devices shown in FIG. 1.

FIG. 9 is a plan view of still another exemplary embodiment of one of the electric heating devices shown in FIG. 1.

Referring to FIG. 9, a heating device 300 includes a pipe 310, first and second heat wires 321 and 322, first and second lower covers 331 and 332, first to fourth power terminals PT1 to PT4, first and second ground terminals GT1 and GT2, and first and second external wire groups EWG1 and EWG2, and a coil 350. The pipe 310, the first and second heat wires 321 and 322, the first and second lower covers 331 and 332, the first and second power terminals PT1 and PT2, the first and second ground terminals GT1 and GT2, and first and second external wire groups EWG1 and EWG2 may be configured substantially the same as the pipe 110, the first and second heat wires 121 and 122, the first and second lower covers 131 and 132, the first and second power terminals PT1 and PT2, the first and second ground terminals GT1 and GT2, and the first and second external wire groups EWG1 and EWG2, respectively. Accordingly, descriptions of these components are unnecessary and will be omitted for clarity and conciseness.

An inductor circuit such as the coil 350 may further be provided. The coil 350 may be disposed on the pipe 310 to be adjacent to the third and fourth power terminals PT3 and PT4 and may be electrically connected between the third and fourth power terminals PT3 and PT4. The coil 350 may include a wire wound around a portion of the pipe 310 at least once and electrically connected to the third and fourth power terminals PT3 and PT4. The coil 350 may be enclosed by the second housing HS2 and sealed by the sealing member filled in the second internal space IS2. Therefore, the coil 350 may be prevented from being corroded and its electrical characteristics can be maintained as desired.

Figure 10:
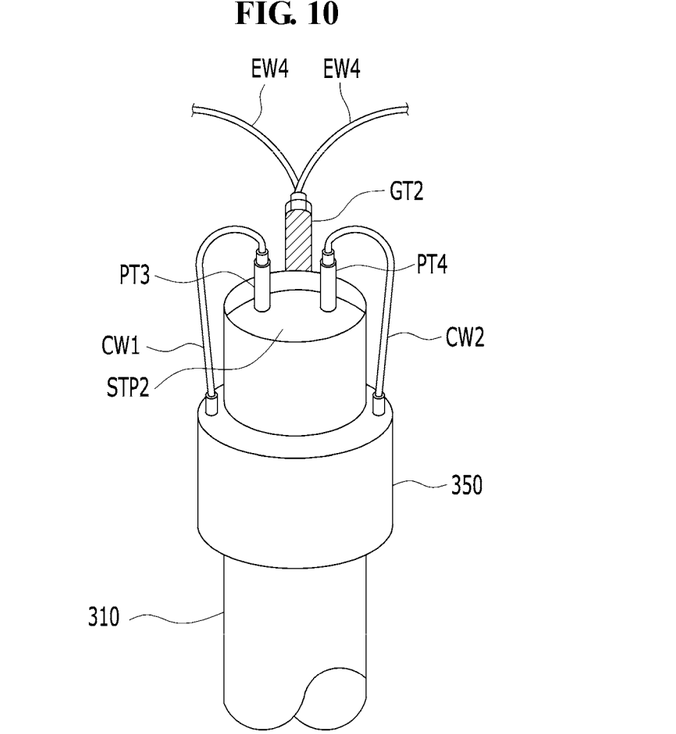
FIG. 10 is a perspective view illustrating the coil and the conductive pipe in the portion C of FIG. 9.
Figure 11:
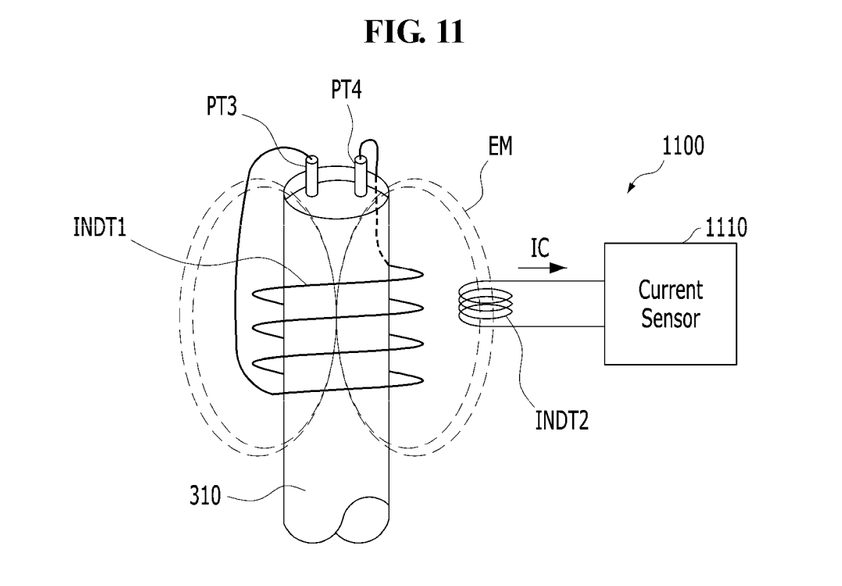
FIG. 11 is a conceptual view illustrating an electromagnetic field induced by the coil of FIG. 9.

FIG. 10 is a perspective view illustrating the coil and the conductive pipe in the portion C of FIG. 9. FIG. 11 is a conceptual view illustrating an electromagnetic field induced by the coil of FIG. 9.

Referring to FIGS. 10 and 11, the coil 350 is mounted on a portion of the pipe 310, and connected to the third and fourth power terminals PT3 and PT4 through first and second connection wires CW1 and CW2. One end of the wire of the coil 350 may be connected to the first connection wire CW1 and the other end of the wire of the coil 350 may be connected to the second connection wire CW2. The first connection wire CW1, the coil 350, and the second connection wire CW2 may define a first inductor circuit INDT1 electrically connected to the third and fourth power terminals PT3 and PT4. The third and fourth power terminals PT3 and PT4 are connected to the first and second heat wires 321 and 322 of FIG. 9, which extend through the second stopper STP2.

The current of the first heat wire 321 may flow through the first inductor circuit INDT1 into the second heat wire 322 when the power is supplied to the heating device 300. The current flowing through the first inductor circuit INDT1 may induce the electromagnetic force EM. A detector 1100 positioned close to the coil 350 (or the second housing HS2 enclosing the coil 350) may detect the electromagnetic force EM, therefore, the user may check whether the heating device 300 operates normally or not without contacting the device.

The detector 1100 may include various devices able to detect the electromagnetic force EM, such as a magnetometer. For example, the detector 1100 may include a second inductor circuit INDT2 and a current sensor 1110 connected to the second inductor circuit INDT2. The second inductor circuit INDT2 may provide induced current IC depending on the electromagnetic force EM according to the mutual inductance between the first inductor circuit INDT1 and the second inductor circuit INDT2. The current sensor 1110 may sense the induced current IC. If any point of the current path including the first external wire EW1, the first heat wire 321, the first inductor circuit INDT1, and the second heat wire 322 is opened or at least damaged, the electromagnetic force EM may not be generated or at least be reduced during the operation. The detector 1100 positioned close to the first inductor circuit INDT1 cannot detect the electromagnetic force EM. As such, the first inductor circuit INDT1 electrically connected to the third and fourth power terminals PT3 and PT4 may allow the user to check whether the heating device 300 operates normally, using the non-contacting detector 1100. Also, the first inductor circuit INDT1 may have a relatively high durability since it is enclosed by the second housing HS2. Further, since the second housing HS2 enclosing the first inductor circuit INDT1 is disposed to be adjacent to the ends of the pipe and the heating device 300 may be buried such that the second housing HS2 is positioned at the edge of an indoor space or out of the indoor space, the negative effect of the electromagnetic force EM on the human body may be relatively low.

Figure 12:
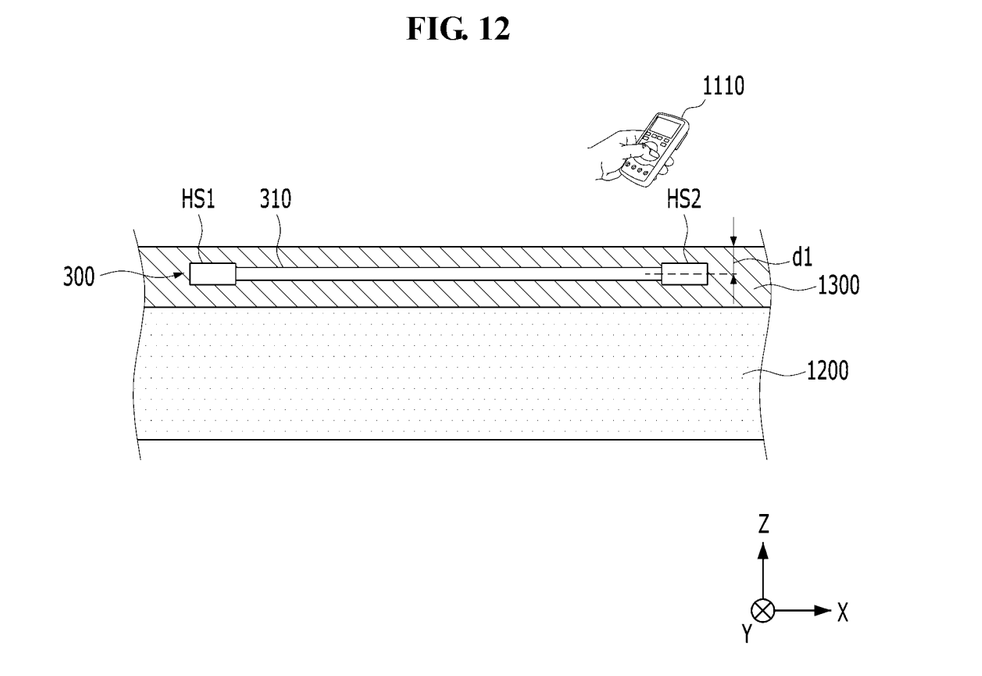
FIG. 12 is a cross-sectional view of another exemplary embodiment of a radiant heating system.

FIG. 12 is a cross-sectional view of another exemplary embodiment of a radiant heating system.

Referring to FIG. 12, a radiant heating system may include a heat insulation layer 1200, a heat dissipation layer 1300, and an electric heater assembly.

The heat insulation layer 1200 may be formed in a floor. The heat insulation layer 1200 may include concrete. The heat dissipation layer 1300 may be formed on the heat insulation layer 1200 and include materials suitable for transmitting the heat from the electric heater assembly to a surface. For example, the heat dissipation layer 1300 may include mortar. The electric heater assembly may be buried in the heat dissipation layer 1300. A further finishing material may be formed on the heat dissipation layer 1300.

In the case where the electric heater assembly includes the heating device 300 described with reference to FIGS. 9 to 11, the heating device 300 includes the second housing HS2 having the first inductor circuit INDT1 of FIG. 11. The electric heater assembly may be positioned at a first distance d1 from the surface, and the first distance d1 may be determined in consideration of the distance at which the electromagnetic force EM generated by the first inductor circuit INDT1 may be measured by the detector 1100. For example, the first distance d1 may be in a range of about 3 cm to about 5 cm. As such, the first inductor circuit INDT1 may allow the user to check which heating device is normal and which heating device is bad by using the non-contacting detector 1100.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An electric heating device comprising:
   a conductive pipe having an interior and at least one end portion;
   one or more heating elements disposed in the interior of the conductive pipe;
   one or more power connectors extending into the interior of the conductive pipe to be electrically connected to the one or more heating elements;
   a ground connector contacting the at least one end portion of the conductive pipe to be electrically connected to the conductive pipe;
   a first member enclosing the at least one end portion of the conductive pipe, the one or more power connectors, and the ground connector; and
   an inductor circuit surrounding a portion of the conductive pipe,
   wherein the one or more power connectors comprise a first power terminal and a second power terminal being electrically connected to each other through the inductor circuit, and the first member encloses the inductor circuit.

2. The electric heating device of the claim 1, further comprising:
a second member disposed in the housing to seal an opening in the at least one end portion of the conductive pipe, the one or more power connectors, and the ground connector.

3. The electric heating device of the claim 1, wherein:
the one or more heating elements comprise a first heat wire and a second heat wire each extending through the conductive pipe; and
the first power terminal is connected to the first heat wire and the second power terminal is connected to the second heat wire.

4. The electric heating device of claim 3, further comprising:
a first external wire connected to the first power terminal through a first node;
a second external wire connected to the second power terminal through a second node; and
a third external wire connected to the ground connector through a third node,
wherein the first member encloses the first to third nodes.

5. The electric heating device of claim 3, further comprising:
a first external wire connected to the ground connector through a first node,
wherein the first member encloses the first node.

6. The electric heating device of claim 5, wherein the first heat wire and the second heat wire are electrically connected to a second external wire and a third external wire, respectively.

7. The electric heating device of claim 1, further comprising:
a first connection wire connecting the first power terminal to a first node; and
a second connection wire connecting the second power terminal to a second node,
wherein the inductor circuit is electrically connected between the first node and the second node, and the first member encloses the first connection wire, the second connection wire, the first node, and the second node.

8. The electric heating device of the claim 1, further comprising:
a heat conduction material disposed in the interior of the conductive pipe; and
an end cap closing an opening into the interior of the conductive pipe to retain the heat conduction material within the interior of the conductive pipe,
wherein the one or more power connectors extend through the end cap.

9. The electric heating device of the claim 1, wherein the first member comprises a housing and the ground connector comprises a ground terminal.

10. An electric heating device comprising:
a conductive pipe having two opposed ends;
heating elements disposed in the conductive pipe;
first power connectors extending through a first one of the ends of the conductive pipe to be electrically connected to the heating elements;
second power connectors extending through a second one of the ends of the conductive pipe to be electrically connected to the heating elements;
a first ground connector contacting a first portion of the conductive pipe adjacent to the first end of the conductive pipe;
a second ground connector contacting a second portion of the conductive pipe adjacent to the second end of the conductive pipe;
a first member enclosing the first power connectors, the first ground connector, and the first portion of the conductive pipe;
a second member enclosing the second power connectors, the second ground connector, and the second portion of the conductive pipe; and
a connection circuit connecting the second power connectors to each other,
wherein the connection circuit comprises:
an inductor circuit surrounding a portion of the conductive pipe; and
connection wires connecting the second power connectors to the inductor circuit.

11. The electric heating device of claim 10, further comprising:
first external wires connected to the first power connectors through first nodes;
a second external wire connected to the first ground connector through a second node;
and
a third external wire connected to the second ground connector through a third node,
wherein the first member encloses the first nodes and the second node, and the second member encloses the connection circuit and the third node.

12. The electric heating device of claim 10, further comprising:
first external wires connected to the first power connectors through first nodes;
a second external wire connected to the first ground connector through a second node;
third external wires connected to the second power connectors through third nodes; and
a fourth external wire connected to the second ground connectors through a fourth node,
wherein the first member encloses the first nodes and the second node, and the second member encloses the third nodes and the fourth node.

13. The electric heating device of the claim 10, further comprising:
a heat conduction material disposed in the interior of the conductive pipe;
a first end cap adjacent to the first end of the conductive pipe to retain the heat conduction material; and
a second end cap adjacent to the second end of the conductive pipe to retain the heat conduction material,
wherein the first power connectors extend through the first end cap, and the second power connectors extend through the second end cap.

14. The electric heating device of claim 10, wherein the first member comprises a first housing and the second member comprises a second housing.

15. The electric heating device of claim 14, wherein the first housing and the second housing are substantially symmetrical to each other.

16. The electric heating device of claim 10, wherein the first and second ground connectors comprise ground terminals.

17. The electric heating device of claim 10, wherein the heating elements comprise wires and the first and second power connectors comprise power terminals.

\* \* \* \* \*